United States Patent [19]

Wasserman et al.

[11] Patent Number: 5,097,524

[45] Date of Patent: Mar. 17, 1992

[54] OPTICAL FIBER TERMINATION

[75] Inventors: Alexander Wasserman, Sepulveda; Norbert Gibola, Canyon Country, both of Calif.

[73] Assignee: G & H Technology, Inc., Camarillo, Calif.

[21] Appl. No.: 524,733

[22] Filed: May 17, 1990

[51] Int. Cl.⁵ .............................. G02B 6/00; G02B 6/36
[52] U.S. Cl. ...................................................... 385/73
[58] Field of Search .......................... 350/96.20–96.22

[56] References Cited

U.S. PATENT DOCUMENTS

| | | | |
|---|---|---|---|
| 4,290,667 | 9/1981 | Chown | 350/96.21 X |
| 4,733,936 | 3/1988 | Mikolaicyk et al. | 350/96.21 |
| 4,786,135 | 11/1988 | Boero | 350/96.21 |

*Primary Examiner*—Akm Ullah
*Attorney, Agent, or Firm*—George J. Netter

[57] ABSTRACT

A terminus for an end portion of an optical fiber has a ferrule with a relatively large passageway extending from an open end to a cylindrical endwall portion, the latter having an opening only slightly larger than fiber glass core with cladding diameter. An optical fiber to be terminated has an end portion stripped of buffer coating and located in the ferrule with the bare glass portion in the smaller opening. A first epoxy secures the fiber within the ferrule. With the fiber end faced-off and polished, the flat face of a plano-convex lens is secured to the ferrule endwall and fiber end by a second epoxy having optical characteristics closely watching those of the lens and fiber. A cylindrical hood fits over the lens and ferrule end. A pair of such terminations are slid into opposite ends of an alignment tube positioning for optical signal transmission.

7 Claims, 3 Drawing Sheets

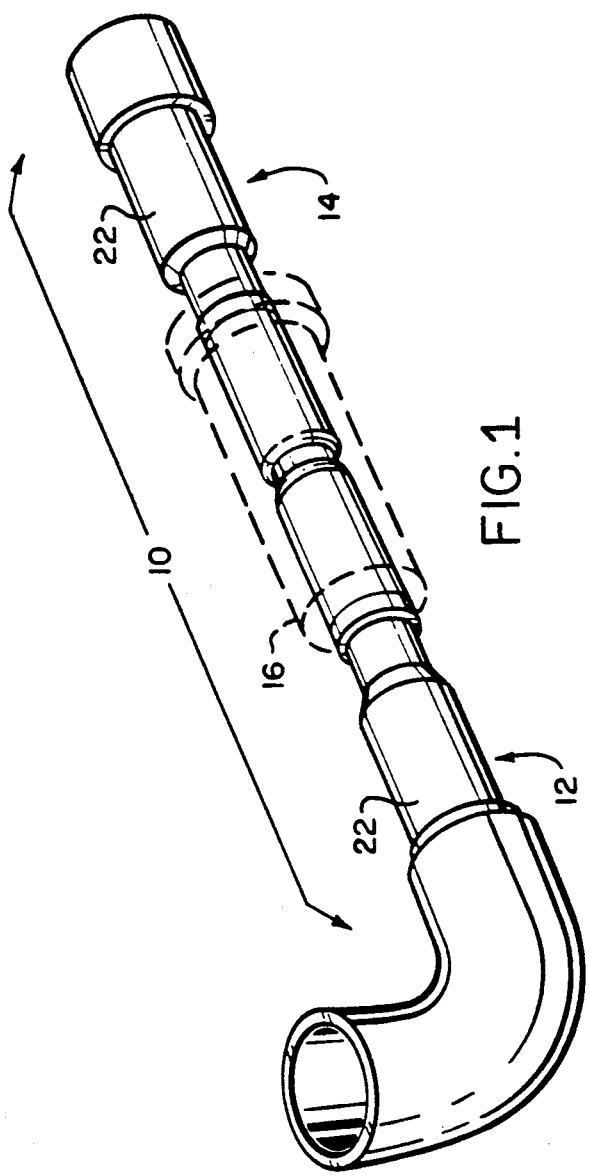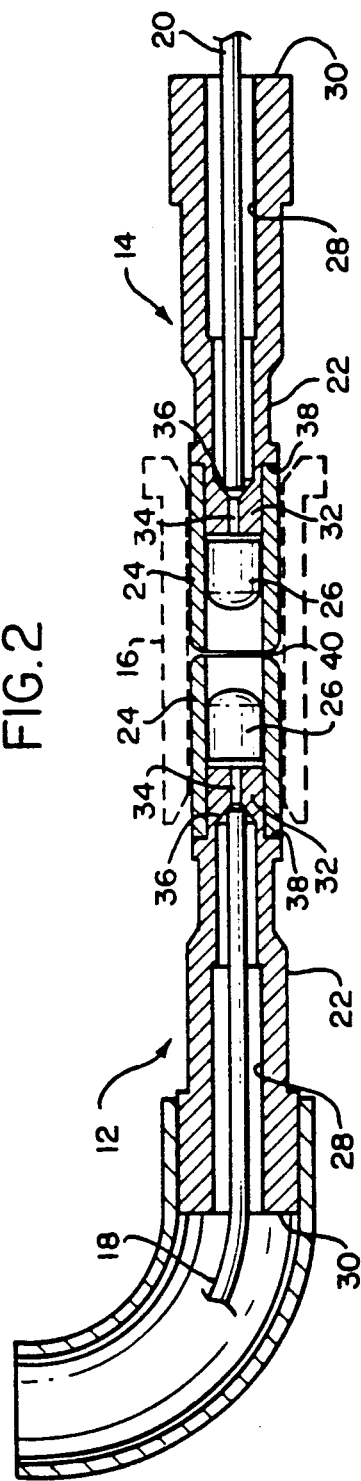

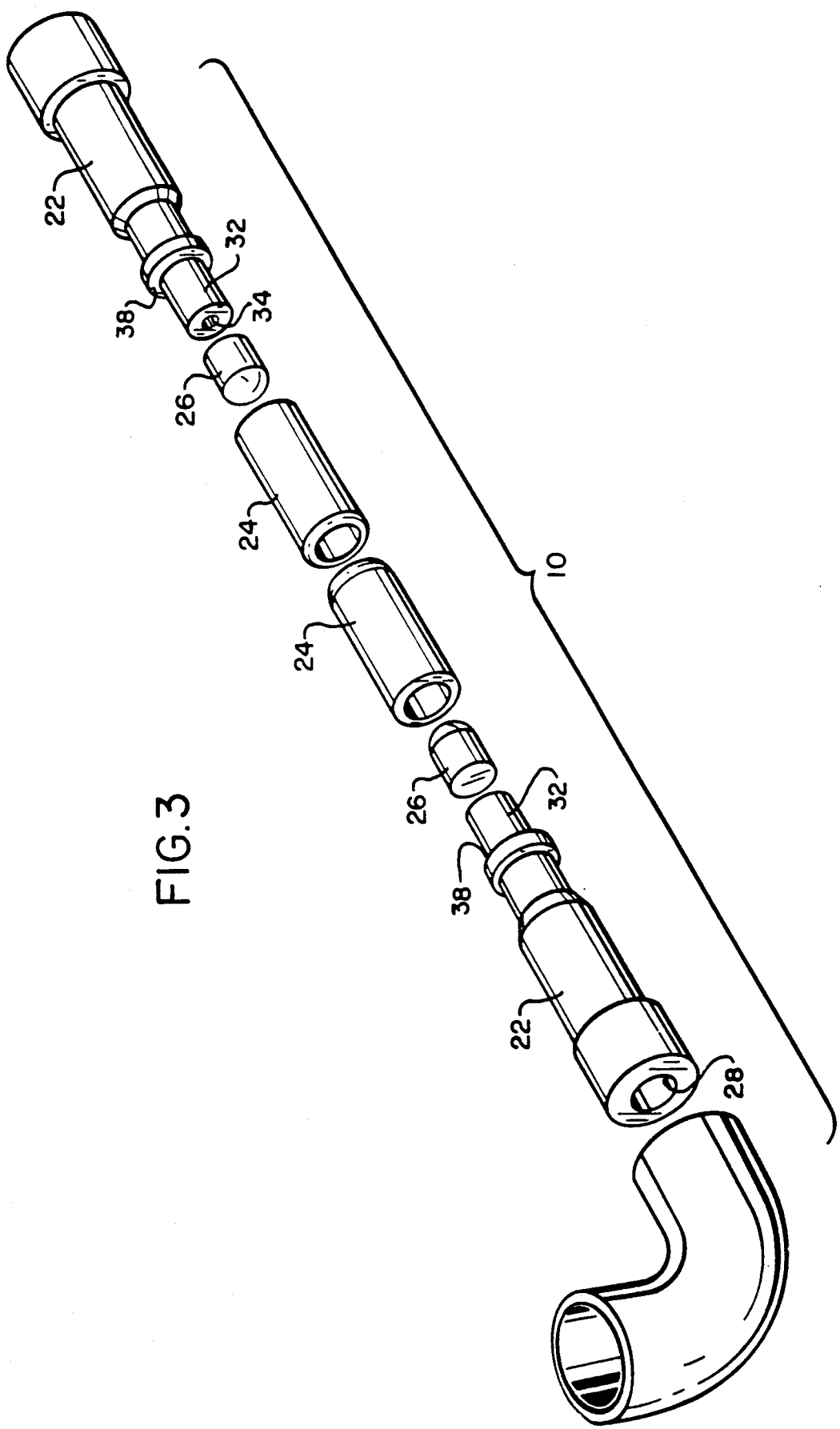

OPTICAL FIBER TERMINATION

BACKGROUND OF THE INVENTION

1. Field of the Invention

The present invention relates generally to forming a junction or terminus for two ends of glass fibers enabling efficient transmission of light signals thereacross, and, more particularly, to an optical fiber termination of improved reliability and having an expanded beam.

2. Description of Related Art

It is important in the optical fiber field to be able to interconnect the ends of two fibers, or two ends of a fiber that had been broken, for transmitting an optical signal across the junction. A satisfactory connection for this purpose must be able to transmit substantially the entire optical signal and not lose more than a few percent of the signal as it passes through the junction.

One approach to effecting termination of a pair of fibers is that disclosed in U.S. Pat. No. 4,483,584 to John Gresty assigned to the same assignee as the present application. As described in this patent, the ends of the two fibers to be interconnected are faced off to form flat, smooth end surfaces precisely normal to the fiber longitudinal axis. Each of the fibers to be interconnected are mounted within separate sets of three cylindrical pins holding the fiber in the interstices of the pins. Then, the three pins with included fiber are received in opposite ends of a cylindrical alignment tube thereby effecting collimation of the two fibers and locating the ends in slightly spaced, end-facing relation. Although such a connector is effective to transmit light across the junction, it is complex and relatively expensive to manufacture and somewhat difficult to utilize for achieving an optical fiber termination in the field.

In another prior art device disclosed in U.S. Pat. No. 4,290,667, OPTICAL FIBER TERMINATIONS AND CONNECTIONS by Mark Chown, each fiber has its end portion received within a capillary tube with a faced-off fiber end located at the focal point of a lens. A pair of such fiber and lens devices are located in opposite ends of an alignment sleeve to complete the terminus. Other versions in the patent include cladding the optical fiber end within a ball lens either through an appropriately dimensioned opening formed in the lens or through a tapered opening in the lens surface. A still further form shown in this patent locates a fiber within a ferrule and with one end of the ferrule having a central recess for receiving a ball lens therein. In this last version, the fiber end is spaced from the ball lens and a quantity of a clear substance (e.g., epoxy) having refractive index closely matching that of the lens interrelates the lens and fiber.

Although the various approaches depicted in the referenced patent are offered as optical fiber connection means, the practical utilization leaves much to be desired. For example, certain of these constructions are very expensive and complex to manufacture. However, the most serious objection to the devices described is that they are difficult to use in a practical context and quite frequently are not reliable in operation, and as well requires highly trained personnel for fabrication and utilization of the described devices. Also, it is important to note that assembly of such devices must be accomplished in special environments since even extremely small (microscopic size) dust particles if located between fiber ends being terminated will produce a substantial reduction in light transmission efficiency.

SUMMARY OF THE INVENTION

The end portion of an optical fiber to be terminated has its end faced-off very precisely at 90 degrees to the optical axis as a precondition to terminating. The termination device or terminus includes a ferrule having an opening extending along substantially the full length of the ferrule housing from the entrance end parallel to the housing longitudinal axis, the opening also having a cross-section many times that of the diameter of the fiber with cladding. This oversized opening communicates with a further second opening in an endwall of the ferrule and extending along the longitudinal axis of the ferrule which has a cross-section slightly larger than that of an optical fiber glass core and cladding. The housing inner wall tapers between the two openings. The ferrule also has a flat outer end face with its peripheral edges adjacent the flat face being radiused.

A sleevelike hood is press fit about the ferrule end portion and includes an outer end portion which is slidingly received about a lens coupled with the included fiber end as will be described.

The optical fiber to be terminated is passed through the ferrule and along the smaller opening until its end is located precisely at the open end face of the housing. A first epoxy material secures the fiber within the ferrule opening.

The flat surface of a plano convex lens constructed of synthetic silica abuts against the outer end of the housing and has a diameter which matches that of the sleeve hood received about the ferrule end. A quantity of a second epoxy material having an index of refraction closely matching that of the lens material is located in a thin film over the end surface of the lens as well as on the ferrule housing outer end surface.

A pair of such fiber terminations are received within opposite ends of a precisely dimensioned cylindrical alignment tube with the ends of the two fiber retainers held in a predetermined spaced apart relation which brings the outer ends of the two plano convex lenses into appropriately spaced relation. Light energy sent along either of the optical fibers toward the terminus will result in an expanded beam which is transmitted through the space between the two lenses received by the other lens and then acted on in a reverse manner to be brought down to size for reception by the optical fiber and transmission therealong.

BRIEF DESCRIPTION OF THE DRAWING

In the accompanying drawings:

FIG. 1 is a perspective view of the terminus of the invention;

FIG. 2 is a side elevational, sectional view of the terminus;

FIG. 3 is an exploded view of the terminus of FIGS. 1 and 2; and

DESCRIPTION OF A PREFERRED EMBODIMENT

Figure 4:
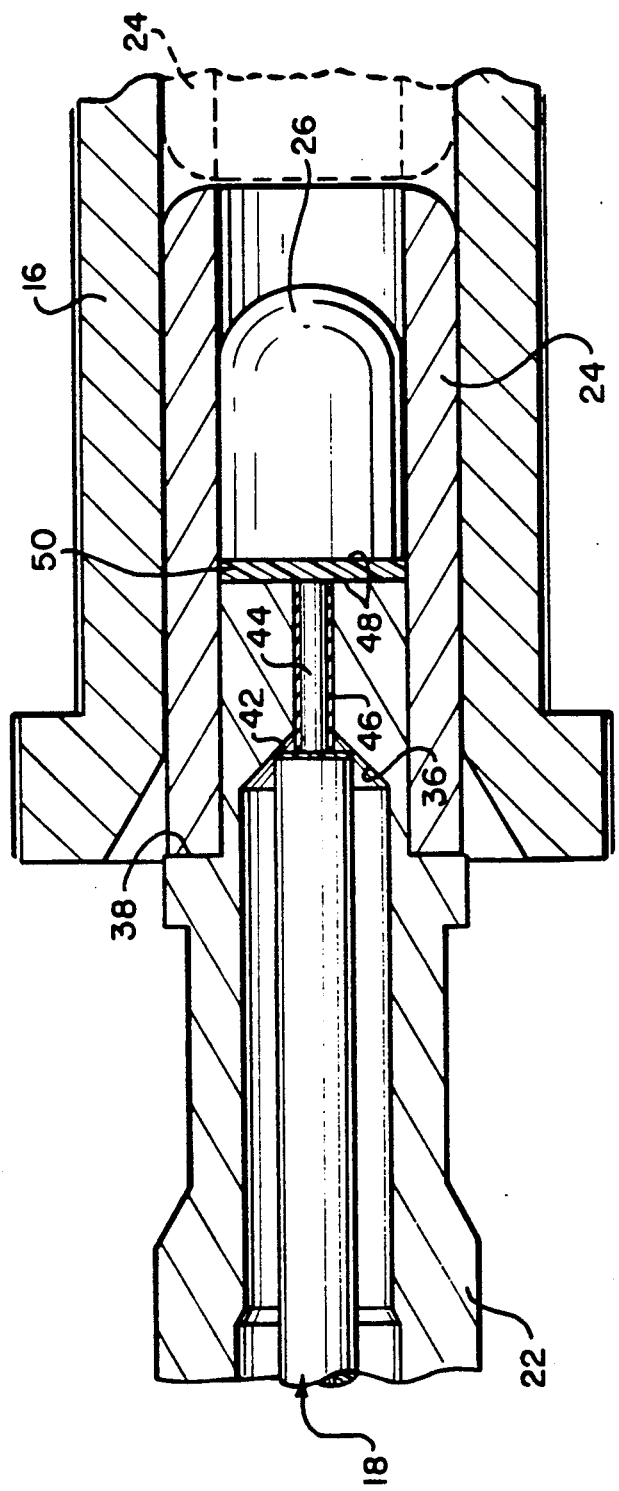
FIG. 4 is an enlarged sectional view of a fiber end portion received within a ferrule and having a lens secured thereto.

It is generally accepted that in order to provide a junction means for two fibers that will satisfactorily transmit an optical signal, certain basic physical relationships must be established for the fibers. First of all, the optical fibers, which are typically very small in cross-sectional dimensions measuring in the thousandths of an inch, must have their ends faced off very precisely to 90 degrees with respect to the fiber longitudinal axis and, in fact, be highly polished in order to provide satisfactory sending and receiving surfaces for the optical signals. Even a very slight imperfection on a fiber end face can produce a deterioration in transmitted signals therethrough of such magnitude as to make any other advantages or operation of a terminus totally unimportant. Therefore, such a terminus must not interfere with or damage the fiber end faces in any way. Additionally, the ends of the fibers across which the signal is to be transmitted, should be very precisely aligned with the end faces held exactly parallel to one another. Lateral misalignment of even a few microns can produce a substantial reduction in efficiency of transmitted signal.

Some alleviation of the parallel fiber end face requirement is achieved when one or more lens are located between the fiber faces. Without lenses the fiber end faces must be located as close as possible without touching to achieve satisfactory signal transmission, and this imposes severe tolerance constraints on the termination design. Also, even if the end spacing requirement is met the exact parallelism of the fiber end faces is highly critical in a no lens connector. An expanded beam lens arrangement serves to correct for any minor inaccuracies in fiber end parallelism and, of course, eliminates the need for the very close spacing of the fiber ends.

For the ensuing detailed description of the termination or terminus of the present invention details, reference is made simultaneously to FIGS. 1 through 3. As shown there, the optical fiber connector 10 is seen to include first and second termini 12 and 14 which are slidingly received within opposite ends of a hollow cylindrical alignment tube 16 appropriately locating the previously faced-off end faces of fibers 18 and 20 to transmit light signals across the junction. Since termini 12 and 14 can be identical, only terminus 12 will be set forth in detail, it being understood that terminus 14 is constructed the same. More particularly, the terminus 12 includes a ferrule 22, within which a fiber end portion is located, and a lens hood 24 is press fit onto an end of the ferrule. A lens 26 of prescribed optical characteristics is secured to the outer end of the ferrule and to the fiber end face as well in a way that will be described. A 90 degree elbow or backshell 27 can be fitted onto the outer end of ferrule 22 in the event the fiber is interconnected with apparatus (not shown) located laterally of the termination connector.

As seen best in FIG. 2, the ferrule 22 is a one-piece hollow cylindrical member with an enlarged central opening 28 extending from one open end 30 to a cylindrical endwall portion 32. The cross-sectional dimensions of opening 28 are larger than those of an optical fiber with buffer coating. The cylindrical end wall portion also includes a further opening 34 that is precisely located along the endwall portion cylindrical axis and which has a cross-section diameter just slightly larger than that of the glass core of a fiber 18, 20. The inner face of endwall portion 32 is formed into a tapered wall 36 which aids in threading the fiber into opening 34 during assembly.

The lens hood 24 is a cylindrical tube having a constant outer diameter and a constant inner diameter, the latter being such as to enable being press fit onto the cylindrical endwall portion 32 (FIG. 2) with the end of the main body abutting against a shoulder 38 between the ferrule and the endwall portion. The opposite or outer end of the hood has its end radiused as at 40. As already referenced, the hood is dimensioned so as to permit being press fit onto the cylindrical endwall portion 22.

As an initial step for assembling the terminus 12 to the end of a fiber 18 as shown in FIG. 4, an end portion of the fiber buffer coating 42 is removed leaving a sufficient length of the bare glass core and cladding 44 for slidingly receipt within the opening 34 so as to locate the faced-off outer end of the glass core substantially coterminous with the outer end face of the endwall portion 32. A quantity of a first epoxy material 46 is applied into ferrule 22 and the glass core/cladding 44 is then inserted into the opening 34 and the ferrule with included fiber is cured at a predetermined temperature in order to solidify the epoxy and insure that the fiber is secured within the ferrule cylindrical endwall portion 32.

Next, the flat surface of the plano-convex lens 26 is affixed to the outer end of the cylindrical endwall portion 32 and fiber end face. The lens has a cylindrical body of circular diameter such as to enable a close sliding fit within the hood 24, One end of the lens is faced off into a circular flat surface 48 and the opposite end is formed into a curved convexly outwardly surface of prescribed curvature. The securement of the lens to the endwall portion 32 (and thus to the fiber end face) is accomplished by use of a second epoxy 50 having optical characteristics (e.g., refractive index) closely matching that of the optical fiber. To further aid in effecting a good optical match, the lens is constructed of a synthetic silica.

Although other adhesive materials may be found suitable to use as the epoxy 46, excellent results have been obtained with an epoxy sold under the trade designation TRA-BOND F 114 which can be used throughout a temperature range of −60° C. to 130° C. Curing is rather simply achieved by exposing to ambient temperature (i.e. 22° C.) for 24 hours.

Also other materials may be found satisfactory, however, best results to date have been obtained by using for the material 50 a commercially available epoxy sold under the name EPO-TEK 301.

The use of two epoxies has been found beneficial in optimizing both high resistance against fiber pullout from the ferrule without sacrificing optical signal transfer.

Still further, it has been found advantageous to secure the bare glass core and cladding end portion 44 of the fiber within the ferrule opening 34 by the first epoxy material 46 before the fiber end has been faced-off (e.g., scribed) and polished. Otherwise, there is the possibility of the fiber end becoming contaminated by the material 46 during assembly.

In operation, the hoods 24 of the two termini 12 and 14 are brought into end abutting contact within the alignment tube 16 which positions the two lenses into a predetermined spaced apart relation. An optical traversing one of the fibers passes through only a thin film (several thousandths of an inch) of the second epoxy 50 before being expanded by a lens 26. The expanded and collimated light signal emitted from the one lens is now picked up by the other lens and the optical treatment is reversed (i.e., focusing the expanded beam onto a fiber end face).

Although the present invention has been described in connection with a preferred embodiment, it is to be understood that those skilled in the appertaining art can make changes that will not depart from the spirit of the invention and will come within the ambit of the appended claims.

What is claimed is:

1. A termination device for an end portion of an optical fiber having the buffer coating removed exposing the bare glass core and cladding, comprising:

a ferrule having a cylindrical endwall and a first longitudinal opening extending from the endwall to an opposite open end of the ferrule, and a second opening in the endwall;

said ferrule first opening having cross-sectional dimensions greater than the outer diameter of an optical fiber with buffer coating and the second opening having cross-sectional dimensions permitting receipt of the fiber glass core and cladding of an optical fiber but not the fiber with buffer coating;

a quantity of a first epoxy material located within the ferrule second opening for securing the outer surface of an optical fiber glass core and cladding within said second opening;

an expanding beam lens located adjacent an outer surface of the ferrule in covering relation to the second opening;

a quantity of a second epoxy material having a refractive index closely matching that of the lens for adhering the lens to both the ferrule outer surface and an end face of the fiber glass core; and a sleeve press fit onto the ferrule endwall and slidingly extending about the lens with the lens spaced from the sleeve outer open end.

2. A termination device as in claim 1, in which the lens is constructed of a synthetic silica.

3. A termination device as in claim 2, in which the lens is of plano-convex geometry having a flat circular surface that is adhered to the ferrule outer surface and a convex surface opposite to the flat surface for beam expansion and collimation, the hollow sleeve dimensions being such as to contain the lens fully within said sleeve.

4. A termination device as in claim 1, in which the ferrule endwall is cylindrical and includes an outer shoulder for limiting the positioning of the sleeve thereon, said ferrule second opening extending along the endwall cylindrical axis.

5. A termination device as in claim 4, in which the lens is constructed of a synthetic silica.

6. A termination device as in claim 5, in which the lens is of plano-convex geometry having a flat circular surface that is adhered to the ferrule outer surface and a convex surface opposite to the flat surface for beam expansion and collimation, the hollow sleeve dimensions being such as to contain the lens fully within said sleeve.

7. A termination device as in claim 1, in which there is further provided an alignment tube, and a pair of termination devices having respective lens sleeves received within opposite ends of said tube with the lens sleeves contacting one another within the tube to maintain a predetermined lens spacing relation.

* * * * *